(No Model.)

T. L. BISSELL.
BICYCLE SAFEGUARD AND SUPPORT.

No. 531,016. Patented Dec. 18, 1894.

WITNESSES

INVENTOR
T. L. Bissell.

Attorney.

UNITED STATES PATENT OFFICE.

TITUS LUCRETIUS BISSELL, OF CHARLESTON, SOUTH CAROLINA.

BICYCLE SAFEGUARD AND SUPPORT.

SPECIFICATION forming part of Letters Patent No. 531,016, dated December 18, 1894.

Application filed January 30, 1894. Serial No. 498,493. (No model.)

*To all whom it may concern:*

Be it known that I, TITUS LUCRETIUS BISSELL, a citizen of the United States, residing at Charleston, in the county of Charleston and State of South Carolina, have invented certain new and useful Improvements in Bicycle Safeguards and Supports; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to improvements in "bicycles;" and consists in an improved mechanical contrivance by which two side arms (*e*) bearing wheels may be thrown forward until they reach the ground, one on each side of the driving wheel, thus enabling the rider to steady his machine while in motion, or to hold the same while the machine is standing still. By this attachment the rider may get on and off the machine with safety. He may start his machine while the two side wheels are on the ground, and after it begins to move, said side wheels may be thrown back out of the way. By the use of said side wheels he may move as slowly as he pleases or stop entirely and yet have his machine stand erect.

Figure 1:
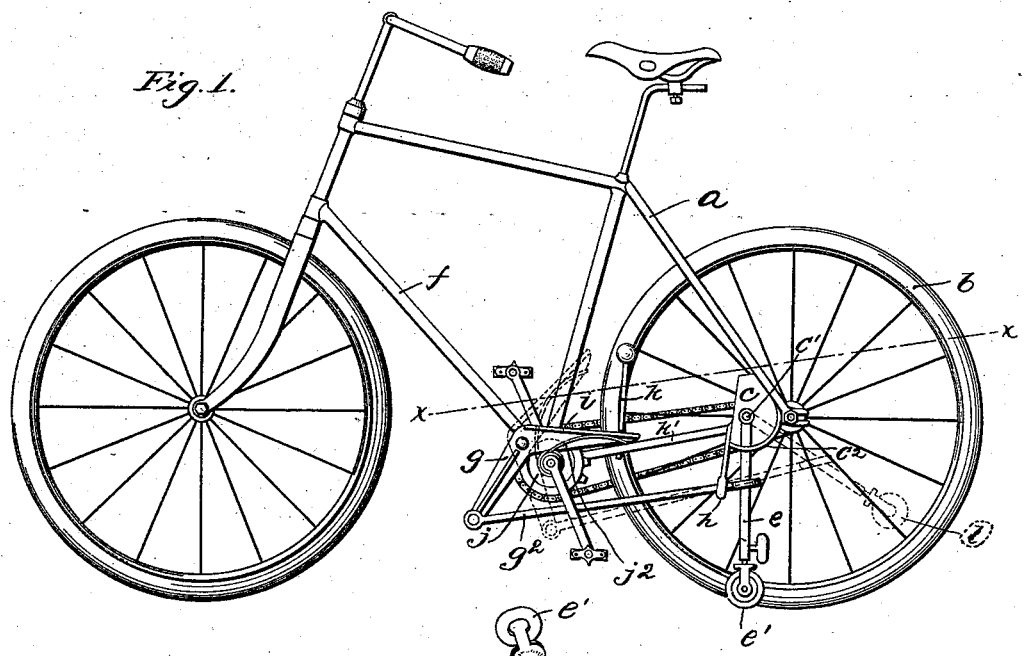
Figure 2:
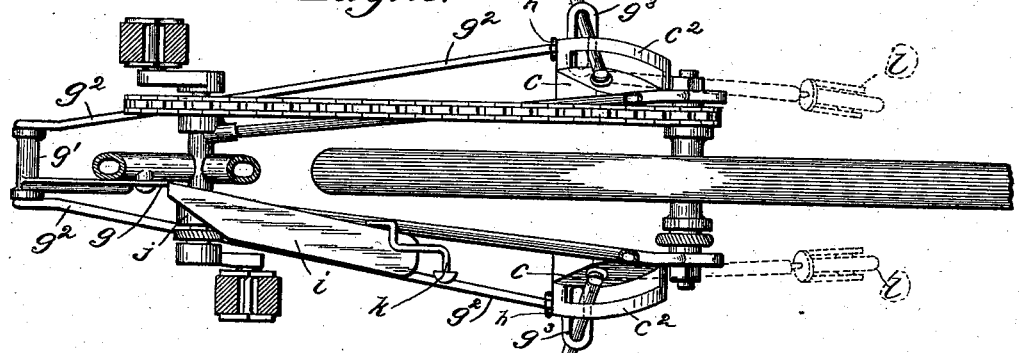
Figure 3:
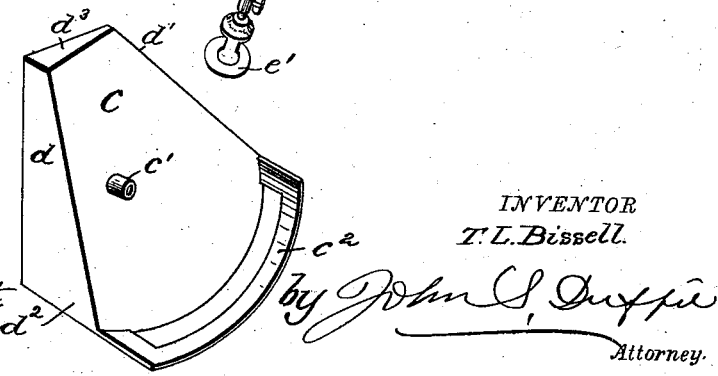

In the accompanying drawings: Figure 1 is a side elevation of a bicycle, showing my improvement attached thereto. Fig. 2 is a top plan view of the same below the line of section $x, x$. Fig. 3 is the angle block to which the arms of the side wheels are pivoted.

My invention is described as follows:

To the bifurcated arm $a$, in which the rear wheel $b$, is journaled are secured the angle blocks $c$. Said angle blocks are provided with an axle or fulcrum $c'$, and a guide $c^2$. The front part $d$, of said angle blocks is much thicker than its rear part $d'$, which comes nearly to an edge, and the lower part $d^2$, of said blocks is much thicker than the upper part $d^3$. The arms $e$, are pivoted to the fulcrum $c'$, and lie flat against the face of said angle blocks, and thus said arms are caused to stand outward, at their lower ends, from the wheel some eight or ten inches more or less. To the lower end of each of these arms $e$, is pivoted a wheel or caster $e'$. To the lower connecting rod $f$, of the bicycle is pivoted an elbow lever $g$, having secured to its front arm a cross rod $g'$, and to each end of said cross rod $g'$, are pivoted arms $g^2$, each of which extends backward and terminates in a loop $g^3$, through which loops pass the arms $e$. These loops extend horizontally from the wheel, so as to allow said arms $e$, to spread as they are drawn forward and contract as they recede. To the front of the blocks $c$, are secured perforated guides $h$, through the perforations of which work the said arms $g^2$. The horizontal end of said elbow lever $g$, is provided with a flange $i$. Around the socket $j$, in which the axle of the sprocket wheel $j'$, is secured a coil spring $j^2$, the free end of which works under the flange $i$, of the elbow lever $g$, and throws the same up when freed from the lock spring $k$. The lower end of said lock spring is secured to the rear connecting rod $k'$, of the bicycle. Said lock spring is provided with a bend or notch in which the flange $i$, is locked.

The elbow lever $g$, the spring $j^2$, and the side arms $g^2$, work on the inside of the pedals and do not interfere with their sweep.

The operation of my invention is as follows: When the bicycle is in motion the arms $e$, and the wheels $e'$, lie back close to the wheel, as indicated by the dotted lines $l$. When the operator wishes to bring the wheels $e'$, forward, he puts his foot on the flange $i$, and presses that end of the lever down until it is caught under the lock of the lock spring $k$. This brings and holds the leg in position, as shown in Fig. 1, and when in this position it can play backward and forward only an inch or two, thus enabling the rider to remove his feet from the lever $g$, and continue to operate the pedals of the wheel. With his supporting legs in this position he can move along as slowly as he pleases or stand entirely still. When he desires that the wheels occupy the position as indicated by the dotted lines $l$, he throws the lock spring $k$, with his foot out of contact with the elbow lever $g$, and said lever thus being freed the spring $j^2$, throws that end of it up and the lower end back, which pushes the arms $e$, back on the inclined face of the angle blocks $c$, until the wheels $e'$, again occupy the position indicated by the dotted lines $l$.

This attachment can be operated by the foot, without at any time stopping the machine, if so desired.

Having described my invention, what I claim as new, and desire to secure by Letters Patent, is—

In combination with a bicycle, substantially as shown and described, the combination of the angle blocks $c$, secured to the bifurcated arm $a$; guides $c^2$, secured to the lower end of said blocks; guides $h$, secured to the front faces of said blocks; arms $e$, pivoted to said angle blocks and operating in guides $c^2$; side arms $g^2$, provided at their rear ends with loop $g^3$, encircling arms $a$; said arms passing through guides $h$, their front ends pivoted to the elbow lever $g$; elbow lever $g$, pivoted to the connecting rod $f$; coil spring $j^2$, secured to the socket $j$, its free end operating the horizontal end of lever $g$; lock spring $k$, adapted to lock the horizontal arm of lever $g$, substantially as shown and described and for the purposes set forth.

In testimony whereof I affix my signature in presence of two witnesses.

TITUS LUCRETIUS BISSELL.

Witnesses:
L. M. HUDSON,
FRANK E. CLEVELAND.